United States Patent
Suwa

(10) Patent No.: US 12,305,004 B2
(45) Date of Patent: May 20, 2025

(54) CATIONICALLY POLYMERIZABLE COMPOSITION

(71) Applicant: JNC CORPORATION, Tokyo (JP)

(72) Inventor: Kazuya Suwa, Chiba (JP)

(73) Assignee: JNC CORPORATION, Tokyo (JP)

( * ) Notice: Subject to any disclaimer, the term of this patent is extended or adjusted under 35 U.S.C. 154(b) by 322 days.

(21) Appl. No.: 17/216,611

(22) Filed: Mar. 29, 2021

(65) Prior Publication Data

US 2021/0301087 A1    Sep. 30, 2021

(30) Foreign Application Priority Data

Mar. 30, 2020   (JP) ................................. 2020-059788

(51) Int. Cl.
   *C09D 183/06*   (2006.01)
   *C08G 77/12*    (2006.01)
   *C08G 77/18*    (2006.01)

(52) U.S. Cl.
   CPC ............. *C08G 77/18* (2013.01); *C08G 77/12* (2013.01); *C09D 183/06* (2013.01); *C08G 2150/00* (2013.01); *Y10T 428/31663* (2015.04)

(58) Field of Classification Search
   CPC .... C08G 77/18; C08G 77/12; C08G 2150/00; C08G 59/68; C08G 59/70; C08G 77/045; C08G 77/38; C08G 77/14; C09D 183/06; Y10T 428/31663; C08L 63/00
   See application file for complete search history.

(56) References Cited

U.S. PATENT DOCUMENTS

| | | | |
|---|---|---|---|
| 2006/0052623 A1 | 3/2006 | Yoshida et al. | |
| 2013/0320264 A1 | 12/2013 | Yoshida et al. | |
| 2015/0023054 A1* | 1/2015 | Goda | G02B 5/0247 |
| | | | 359/584 |
| 2015/0368397 A1 | 12/2015 | Suwa et al. | |
| 2019/0071409 A1* | 3/2019 | Kameyama | C08G 59/20 |
| 2019/0185711 A1* | 6/2019 | Suwa | C08G 77/12 |
| 2022/0282059 A1* | 9/2022 | Nuida | C08K 3/08 |

FOREIGN PATENT DOCUMENTS

| | | |
|---|---|---|
| JP | 2009167390 | 7/2009 |
| WO | 2004024741 | 3/2004 |
| WO | 2012111765 | 8/2012 |
| WO | 2014046095 | 3/2014 |
| WO | WO 2018/037565 | * 12/2018 |

* cited by examiner

*Primary Examiner* — Michael B Nelson

(74) *Attorney, Agent, or Firm* — JCIPRNET

(57) ABSTRACT

A cationically polymerizable composition that provides a cured product and having an excellent balance of adhesion to various substrates, particularly, a silver substrate, and excellent handling properties. A cationically polymerizable composition including a double-decker type silsesquioxane compound having at least one alicyclic epoxy group in one molecule (A), a cationically polymerizable compound (B), a compound having a vinyl group and a cationically polymerizable cyclic ether (C), and a chelate-modified epoxy compound (D).

3 Claims, No Drawings

CATIONICALLY POLYMERIZABLE COMPOSITION

CROSS-REFERENCE TO RELATED APPLICATION

This application claims the priority benefits of Japanese application no. 2020-059788, filed on Mar. 30, 2020. The entirety of the above-mentioned patent application is hereby incorporated by reference herein and made a part of this specification.

BACKGROUND

Technical Field

The disclosure relates to a cationically polymerizable composition, and specifically, to a cationically polymerizable composition that provides a cured product having excellent adhesion.

Description of Related Art

In recent years, there have been significant improvements in the performance of electronic devices and in integration technology, and higher performance and better functionality have been required for the materials constituting electronic devices. Silicon-oxygen compounds represented by silicas and silicones have been receiving attention as organic-inorganic hybrid materials because they exhibit properties not observed in organic materials alone.

Patent Document 1 (Japanese Patent Laid-Open No. 2009-167390) discloses that, when a thermosetting resin composition including specific silsesquioxane derivatives, cyclohexane-1,3,4-tricarboxylic acid-3,4-anhydride and other acid anhydrides is used, it is possible to obtain a cured product having favorable heat resistance and transparency.

Patent Document 2 (PCT International Publication No. WO 2014/046095) discloses a novel silicon compound obtained by a hydrosilylation reaction of a compound (a) that is a silsesquioxane derivative having two or more SiH groups in one molecule, a compound (b) that is a compound having an epoxy and/or oxetanyl group in one molecule and an alkenyl group having 2 to 18 carbon atoms, and a compound (c) that is a compound having an alkoxysilyl group in one molecule and an alkenyl group having 2 to 18 carbon atoms. Further, it is disclosed that, when a resin composition including the silicon compound is used, a cured product which has heat resistance, heat-resistant yellowing resistance, light resistance, transparency and a high refractive index and has or is improved in at least one property among properties such as adhesion to a substrate, heat cycle resistance, mechanical properties, gas barrier properties and excellent durability after a long-term high temperature test is obtained.

Patent Document 3 (PCT International Publication No. WO 2018/037565) discloses that, when an epoxy resin composition including (A) an epoxy resin. (B) a specific silsesquioxane compound, and (C) a nano silica filler is used, curing shrinkage during curing is minimized and a cured film having low warpage and high adhesion is obtained.

PATENT DOCUMENTS

In recent years, various substrates have been used depending on applications of electronic devices and the like. Among these, materials having excellent adhesion to a silver substrate have been required.

The disclosure provides a cationically polymerizable composition that provides a cured product having an excellent balance between adhesion to various substrates, particularly, a silver substrate, and handling properties.

The inventors conducted extensive studies and as a result, found that a silsesquioxane compound having a double-decker structure, a compound having a vinyl group and a cationically polymerizable cyclic ether, and a chelate-modified epoxy resin can be combined with a cationically polymerizable compound to obtain a cationically polymerizable composition, and thus a cationically polymerizable composition having a viscosity at which handling is easy can be realized. A compound having a vinyl group generally has an effect of increasing a curing rate in cationic polymerization, but may deteriorate adhesion between the cured product obtained by rapid curing and a substrate. Surprisingly, the inventors found that a cured product obtained by combining a compound having a vinyl group and a cationically polymerizable cyclic ether, a silsesquioxane compound having a double-decker structure, and a chelate-modified epoxy resin with a cationically polymerizable compound and performing curing has excellent adhesion to various substrates, particularly, a silver substrate, and completed the disclosure.

SUMMARY

The embodiments of the disclosure include the following configurations.

[1] A cationically polymerizable composition including a compound (A) represented by Formula (1), a cationically polymerizable compound (B), a compound having a vinyl group and a cationically polymerizable cyclic ether (C), and a chelate-modified epoxy resin (D):

[Chem. 1]

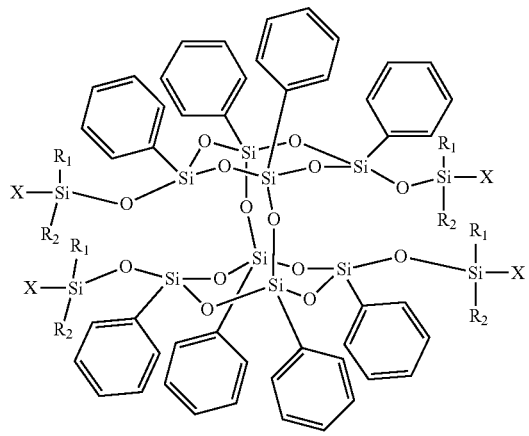

(1)

in Formula (1), $R_1$ and $R_2$ independently represent an alkyl group or phenyl group having 1 to 10 carbon atoms, X's independently represent a hydrogen atom or a monovalent organic group, and at least one X is an alicyclic epoxy-containing group.

DESCRIPTION OF THE EMBODIMENTS

[1] A cationically polymerizable composition including a compound (A) represented by Formula (1), a cationically polymerizable compound (B), a compound having a vinyl group and a cationically polymerizable cyclic ether (C), and a chelate-modified epoxy resin (D):

[Chem. 1]

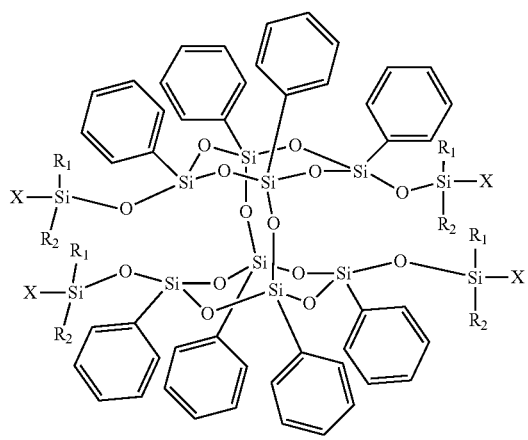

(1)

in Formula (1), $R_1$ and $R_2$ independently represent an alkyl group or phenyl group having 1 to 10 carbon atoms. X's independently represent a hydrogen atom or a monovalent organic group, and at least one X is an alicyclic epoxy-containing group.

[2] The cationically polymerizable composition according to [1], wherein, in Formula (1), all of $R_1$'s and $R_2$'s are a methyl group or an ethyl group.

[3] The cationically polymerizable composition according to [1] or [2], wherein, in Formula (1), all X's are an alicyclic epoxy-containing group.

[4] The cationically polymerizable composition according to any one of [1] to [3], wherein the compound (A) represented by Formula (1) is a compound represented by Formula (2):

[5] The cationically polymerizable composition according to any one of [1] to [4], wherein the cationically polymerizable compounds (B) include at least one epoxy compound and at least one oxetane compound, and in the cationically polymerizable composition, the content (mass %) of the epoxy compound is larger than the content (mass %) of the oxetane compound.

[6] The cationically polymerizable composition according to any one of [1] to [4], wherein the cationically polymerizable compounds (B) include at least one bi- or higher functional epoxy compound and at least one bi- or higher functional oxetane compound, and in the cationically polymerizable composition, a ratio between the content (mass %) of the epoxy compound and the content (mass %) of the oxetane compound is 10:1 to 2:1.

[7] The cationically polymerizable composition according to any one of [1] to [6], wherein the compound (C) having a vinyl group and a cyclic ether is a compound represented by Formula (3):

[Chem. 3]

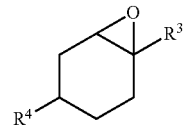

(3)

in the above formula, $R^3$ represents a hydrogen atom or an alkyl group having 1 to 40 carbon atoms, and in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; and $R^4$ represents an alkenyl group having 2 to 20 carbon atoms having a vinyl group at the terminal, and any hydrogen atom may be independently substituted with a fluorine atom, and any —$CH_2$— may

[Chem. 2]

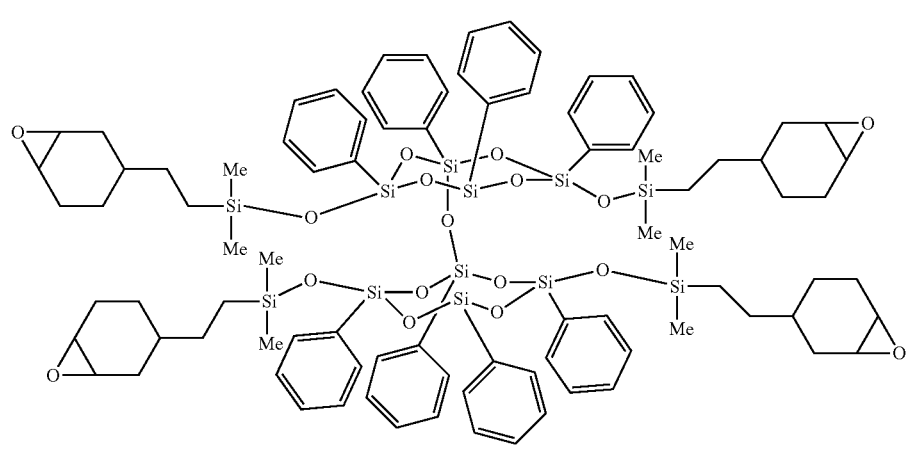

(2)

be independently substituted with —O— or a cycloalkylene group having 5 to 20 carbon atoms.

[8] The cationically polymerizable composition according to [7], wherein the compound (C) having a vinyl group and a cyclic ether is a compound represented by Formula (4):

[Chem. 4]

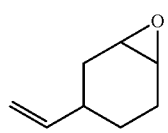
(4)

[9] A laminate including a substrate and a cured film obtained by curing the cationically polymerizable composition according to any one of [1] to [8] formed on the substrate.

[10] The laminate according to [9], wherein the substrate is one selected from the group consisting of a metal oxide, a metal substrate, and a plastic film.

According to the disclosure, a cationically polymerizable composition which has excellent handling properties and provides a cured product having excellent adhesion to various substrates, particularly, a silver substrate, is provided.

Hereinafter, embodiments of the disclosure will be described in detail, but in the following description, embodiments of the disclosure are examples (representative examples), and the disclosure is not limited to these contents. In addition, the embodiments of the disclosure can be appropriately combined.

1. Cationically Polymerizable Composition

A cationically polymerizable composition according to a first embodiment of the disclosure includes a compound (A) represented by Formula (1), a cationically polymerizable compound (B), a compound having a vinyl group and a cationically polymerizable cyclic ether (C), and a chelate-modified epoxy resin (D). In the cationically polymerizable composition, a total amount of (A) to (D) is preferably 80% or more, and more preferably 90% or more, and preferably 99% or less, and more preferably 98.5% or less.

Hereinafter, "compound (A) represented by Formula (1)," "cationically polymerizable compound (B)," "compound having a vinyl group and a cationically polymerizable cyclic ether (C)," "chelate-modified epoxy resin (D)" and the like will be described.

1.1 Compound (A) Represented by Formula (1)

A cationically polymerizable composition which is one embodiment of the disclosure includes a compound (A) represented by Formula (1). The compound (A) represented by Formula (1) is a double-decker type silsesquioxane compound having at least one alicyclic epoxy group in one molecule.

[Chem. 5]

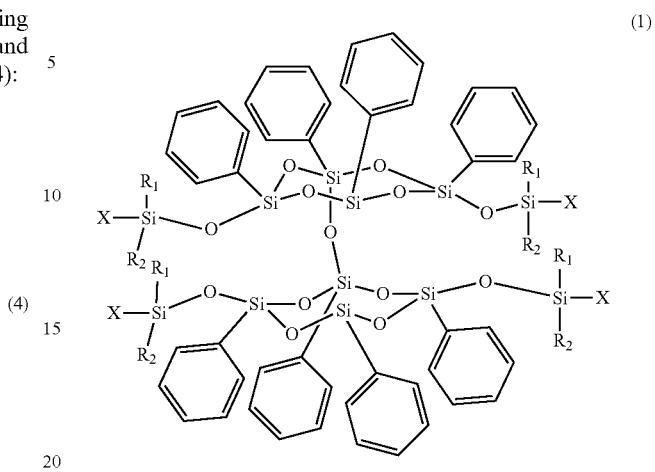
(1)

In Formula (1), $R_1$ and $R_2$ independently represent an alkyl group or phenyl group having 1 to 10 carbon atoms. X's independently represent a hydrogen atom or a monovalent organic group, and at least one X is an alicyclic epoxy-containing group.

($R_1$, $R_2$)

$R_1$ and $R_2$ independently represent an alkyl group or phenyl group having 1 to 10 carbon atoms.

$R_1$'s and $R_2$'s may be the same as or may be different from each other. The alkyl group is a functional group obtained by removing one hydrogen atom from the terminal of an alkane and is represented by $C_nH_{2n+1}$.

$R_1$ and $R_2$ may be any linear and branched alkyl group. Here, in the case of a branched chain, carbon atoms in the branched chain are also included in the number of carbon atoms. Specific examples of alkyl groups having 1 to 10 carbon atoms include a methyl group, an ethyl group, a propyl group, a 1-methylethyl group, a butyl group, a 2-methylpropyl group, a 1,1-dimethylethyl group, a 2,2-dimethylpropyl group, a 1-methylpropyl group, a pentyl group, a hexyl group, a 1,1,2-trimethylpropyl group, a heptyl group, an octyl group, a nonyl group, and a decyl group.

In consideration of ease of synthesis, the number of carbon atoms of $R_1$ is preferably 1 to 8 and more preferably 1 to 6.

In consideration of ease of synthesis, the number of carbon atoms of $R_2$ is preferably 1 to 8 and more preferably 1 to 6.

In consideration of heat resistance and productivity. $R_1$ and $R_2$ are preferably the same alkyl group, and all of $R_1$'s and $R_2$'s are particularly preferably methyl groups or ethyl groups, and all of $R_1$'s and $R_2$'s are most preferably methyl groups.

(X)

X's independently represent a hydrogen atom or a monovalent organic group, and at least one X is an alicyclic epoxy-containing group. In this specification, the alicyclic epoxy group is a monovalent substituent having a condensed ring of an epoxy ring and a substituted or unsubstituted saturated hydrocarbon ring and is preferably a monovalent substituent having a condensed ring of an epoxy ring and a cycloalkane ring. Examples of more preferable alicyclic epoxy groups include those having one or more structures in which an epoxy ring and a cyclohexane ring are condensed in one molecule.

In Formula (1), X's may be the same as or may be different from each other. In one molecule of the compound represented by Formula (1), at least one X includes an alicyclic epoxy group, preferably, two X's are alicyclic epoxy-containing groups, and more preferably, three X's are alicyclic epoxy-containing groups, and in consideration of reactivity, compatibility with (B) to (D), heat resistance, and stability of a cured product, most preferably, all four X's are alicyclic epoxy-containing groups.

Here, the monovalent organic group includes groups other than an alicyclic epoxy group, and examples thereof include alkoxy groups, aryloxy groups, amino groups, amide groups, alkoxycarbonyl groups, aryloxycarbonyl groups, alkylcarbonyl groups, arylcarbonyl groups, alkylthio groups, arylthio groups, epoxy groups, vinyl ether groups, aliphatic hydrocarbon groups which may have a substituent, aromatic hydrocarbon groups which may have a substituent, aliphatic heterocyclic groups which may have a substituent, and aromatic heterocyclic groups which may have a substituent. Examples of substituents include alkoxy groups, aryloxy groups, amino groups, amide groups, alkoxycarbonyl groups, aryloxycarbonyl groups, alkylcarbonyl groups, arylcarbonyl groups, alkylthio groups, arylthio groups, epoxy groups, alicyclic epoxy groups, vinyl ether groups, and halogens. In addition, the number of substituents is not particularly limited and a plurality of substituents may be included as long as such substitution is possible. In addition, two or more substituents may be included. In addition, any non-adjacent —CH$_2$— may be substituted with —O— or —CH=CH—.

Regarding the compound (A) represented by Formula (1), in consideration of adhesion of the obtained cured product to various substrates, particularly, a silver substrate, the compound represented by Formula (2) is particularly preferable.

and more preferably 10 mass % to 25 mass %. When the content of the compound (A) represented by Formula (1) is set to be within this range, the obtained cured product exhibits excellent properties regarding heat resistance, transparency, yellowing resistance, heat-resistant yellowing resistance, light resistance, surface hardness and adhesion, and photocationic curability.

1.2 Cationically Polymerizable Compound (B)

The cationically polymerizable composition which is one embodiment of the disclosure includes a cationically polymerizable compound (B). The cationically polymerizable compound (B) may be a photocationically polymerizable compound or a thermally cationically polymerizable compound.

Examples of cationically polymerizable compounds (B) include a cyclic ether compound. Examples of cyclic ether compounds include cationically polymerizable (ring-opening polymerizable) compounds such as an epoxy compound, an oxetane compound, and an oxolane compound (tetrahydrofuran, substituted tetrahydrofuran, etc.).

The epoxy compound is a compound having an epoxy group, and examples thereof include a glycidyl ether epoxy compound, a glycidyl ester epoxy compound, and an alicyclic epoxy compound.

In the epoxy compound, the number of epoxy groups may be 1 or more, but a compound having at least two or more epoxy groups may be included.

Specific examples of epoxy compounds include 3',4'-epoxycyclohexylmethyl 3,4-epoxycyclohexanecarboxylate. 3,4,3',4'-diepoxybicyclohexyl, 1,2-epoxy-4-vinylcyclohexane. ε-caprolactone-modified 3',4'-epoxycyclohexylmethyl 3,4-epoxycyclohexanecarboxylate. 2,2-bis(4-glycidyloxyphenyl) propane, and a mixture of 2-[4-(2,3-epoxypropoxy)phenyl]-2-[4-[1,1-bis[4-([2,3-epoxypropoxy]phe-

[Chem. 6]

(2)

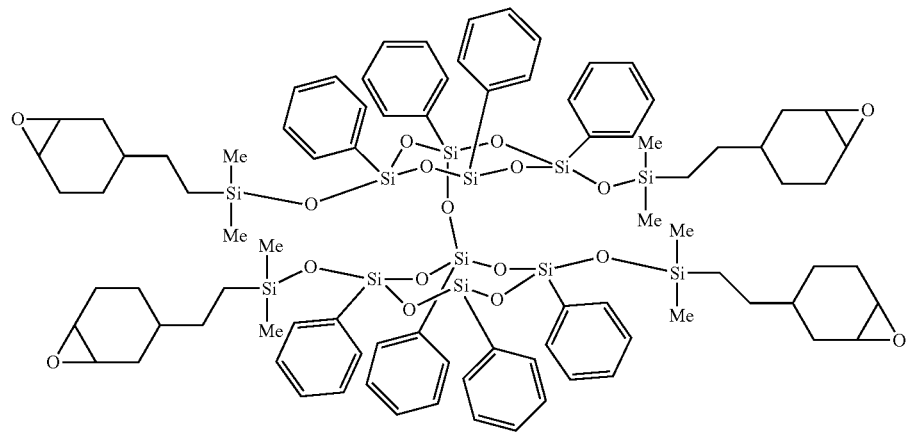

The compound (A) represented by Formula (1) can be synthesized, for example, according to the method described in PCT International Publication No. WO 2004/024741. The compound represented by Formula (2) can be produced according to, for example, the method described in Synthesis Example 1 in PCT International Publication No. WO 2012/111765.

In the cationically polymerizable composition which is one embodiment of the disclosure, the content of the compound (A) represented by Formula (1) with respect to a total amount of (A) to (D) is preferably 5 mass % to 30 mass % nyl)]ethyl]phenyl]propane and 1,3-bis[4-[1-[4-(2,3-epoxypropoxy)phenyl]-1-[4-[1-[4-(2,3-epoxypropoxy)phenyl]-1-methylethyl]phenyl]ethyl]phenoxy]-2-propanol, and 2-[4-(2,3-epoxypropoxy)phenyl]-2-[4-[1,1-bis[4-([2,3-epoxypropoxy]phenyl)]ethyl]phenyl]propane.

In addition, the epoxy compound may be any of an epoxy monomer, an epoxy oligomer and an epoxy resin, and the following commercial products can be used. Examples of glycidyl ether type epoxy resins having 3 to 20 epoxy groups per molecule and a weight average molecular weight of less than 5,000 include TECHMORE VG3101L (commercially available from Printec Corporation), EPPN-501H, 502H (commercially available from Nippon Kayaku Co., Ltd.), and JER 1032H60 (commercially available from Mitsubishi Chemical Corporation), examples of bisphenol A novolac type epoxy resins include JER 157S65, and 157S70 (commercially available from Mitsubishi Chemical Corporation), examples of phenol novolac type epoxy resins include EPPN-201 (commercially available from Nippon Kayaku Co., Ltd.), and JER 152 and 154 (commercially available from Mitsubishi Chemical Corporation), and examples of cresol novolac type epoxy resins include EOCN-102S, 103S, 104S, and 1020 (commercially available from Nippon Kayaku Co., Ltd.). In addition, examples of multi-functional epoxy monomers include Celloxide (registered trademark) CEL2021P, CEL2000, and CEL8000 (commercially available from Daicel Corporation).

Examples of oxetane compounds include bifunctional oxetane compounds such as 3,7-bis(3-oxetanyl)-5-oxanonane, 1,4-bis[(3-ethyl-3-oxetanylmethoxy)methyl]benzene. 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, 1,4-bis(3-ethyl-3-oxetanylmethoxy)butane, 1,6-bis(3-ethyl-3-oxetanylmethoxy) hexane, 3-ethyl-3-(3-ethyl-3-oxetanylmethyl-oxymethyl)oxetane, and xylylene bisoxetane, and monofunctional oxetane compounds such as 3-ethyl-3-[(phenoxy)methyl]oxetane, 3-ethyl-3-(hexyloxymethyl) oxetane, 3-ethyl-3-(2-ethylhexyloxymethyl)oxetane, 3-ethyl-3-(hydroxymethyl)oxetane, and 3-ethyl-3-(chloromethyl)oxetane.

The cationically polymerizable compounds (B) may be used alone or two or more thereof may be used in combination. In consideration of ease of handling of the cationically polymerizable composition and improvement in adhesion of a cured product of the cationically polymerizable composition to various substrates, particularly, a silver substrate, the cationically curable composition preferably includes an epoxy compound or an oxetane compound, more preferably includes a bi- or higher functional epoxy compound or a bi- or higher functional oxetane compound, and still more preferably includes at least one epoxy compound and at least one oxetane compound, and the content (mass %) of the epoxy compound in the cationically polymerizable composition is larger than the content (mass %) of the oxetane compound.

Preferable examples of bi- or higher functional epoxy compounds include 3',4'-epoxycyclohexylmethyl, 3,4,3',4'-diepoxybicyclohexyl, 1,1,3,3-tetramethyl-1,3-bis[2-(7-oxabicyclo[4.1.0]hepto-3-yl)ethyl]disiloxane, and 2,4,6,8-tetramethyl-2,4,6,8-tetrakis[2-(3,4-epoxycyclohexyl)ethyl] cyclotetrasiloxane. For example, Celloxide (registered trademark) CEL2021P and CEL8000 (commercially available from Daicel Corporation) are commercially available. Among these, the following compound (3',4'-epoxycyclohexylmethyl) is preferable.

[Chem. 7]

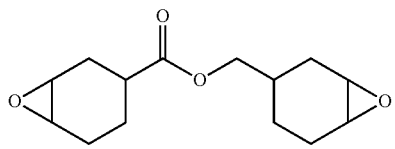

Preferable examples of bi- or higher functional oxetane compounds include dioxetanyl ether. For example, oxetane compounds [Aron Oxetane (registered trademark) (product name) OXT-221 (DOX)], and [Aron Oxetane (registered trademark) (product name) OXT-121 (XDO)] (commercially available from Toagosei Co., Ltd.) are commercially available. Among these, the following compound (3-ethyl-3 {[(3-ethyloxetane-3-yl)methoxy]methyl}oxetane) is preferable.

[Chem. 8]

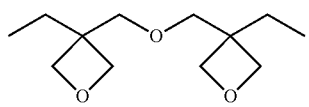

The content of the cationically polymerizable compound (B) in the cationically polymerizable composition which is one embodiment of the disclosure with respect to a total amount of (A) to (D) is preferably 20 mass % to 80 mass % and more preferably 30 mass % to 60 mass %. Within this range, the cationically polymerizable composition has low viscosity and excellent handling properties, and the obtained cured product exhibits excellent properties regarding heat resistance, transparency, yellowing resistance, heat-resistant yellowing resistance, light resistance, surface hardness and adhesion, and photocationic curability.

In one embodiment of the disclosure, in consideration of handling properties of the cationically polymerizable composition, adhesion of the cured product to various substrates, particularly, a silver substrate, and curability (curing rate) of the composition, the cationically polymerizable compounds (B) include at least one bi- or higher functional epoxy compound and at least one bi- or higher functional oxetane compound, and a ratio (content (mass %) of bi- or higher functional epoxy compound: content (mass %) of oxetane compound) between the content (mass %) of the epoxy compound and the content (mass %) of the oxetane compound in the cationically polymerizable composition is preferably 10:1 to 2:1.

The cationically polymerizable composition of the disclosure is a liquid even if it does not include a solvent. In one embodiment of the disclosure, in which the rotational viscosity of the cationically polymerizable composition can be generally set to 1 to 3,000 mPa·sec at 25° C., the content and type of (A) to (D) can be selected such that the rotational viscosity can be set to 1 to 500 mPa·sec at which handling properties are particularly excellent. In particular, when at least one bi- or higher functional epoxy compound and at least one bi- or higher functional oxetane compound at a specific ratio are used as the cationically polymerizable compounds (B), it is possible to easily adjust the viscosity of the cationically polymerizable composition.

1.3 Compound (C) Having Vinyl Group and Cationically Polymerizable Cyclic Ether

The cationically polymerizable composition which is one embodiment of the disclosure includes a compound having a vinyl group and a cationically polymerizable cyclic ether (C).

The compound having a vinyl group and a cationically polymerizable cyclic ether is not particularly limited as long as it has a vinyl group and a cationically polymerizable cyclic ether, and is preferably a compound represented by Formula (3).

[Chem. 9]

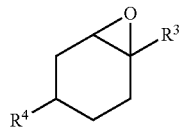

(3)

In the above formula. $R^3$ represents a hydrogen atom or an alkyl group having 1 to 40 carbon atoms, and in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; and $R^4$ represents an alkenyl group having 2 to 20 carbon atoms having a vinyl group at the terminal, and any hydrogen atom may be independently substituted with a fluorine atom, and any —$CH_2$— may be independently substituted with —O— or a cycloalkylene group having 5 to 20 carbon atoms.

The compound represented by Formula (3) has an epoxy cyclohexyl group as a cationically polymerizable cyclic ether and has a vinyl group ($CH_2$=CH—) for a polymerizable functional group at the terminal of $R^4$.

Among these, in consideration of improvement in adhesion of the cured product to various substrates, particularly, a silver substrate, curability, low viscosity, and ease of availability, the compound represented by Formula (4) is particularly preferable. Celloxide (registered trademark) CEL2000 (commercially available from Daicel Corporation) is commercially available.

[Chem. 10]

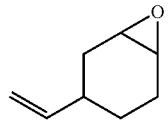

(4)

In the cationically polymerizable composition which is one embodiment of the disclosure, the content of the compound having a vinyl group and a cationically polymerizable cyclic ether (C) with respect to a total amount of (A) to (D) is preferably 1 to 30 mass % and more preferably 5 to 15 mass %. Within this range, the cationically polymerizable composition has excellent handling properties, and the obtained cured product exhibits excellent properties regarding heat resistance, transparency, yellowing resistance, heat-resistant yellowing resistance, light resistance, surface hardness and adhesion, and photocationic curability. Here, when the content in the cationically polymerizable composition is calculated, the compound having a vinyl group and a cationically polymerizable cyclic ether is not included in "cationically polymerizable compound (B)."

1.4 Chelate-Modified Epoxy Resin (D)

The cationically polymerizable composition which is one embodiment of the disclosure includes a chelate-modified epoxy resin (D) which is an epoxy resin having a chelate-forming group at the basic framework, side chain or terminal. Regarding the chelate-forming group, those containing electron-donating elements such as N atoms, S atoms, O atoms, and P atoms, for example, acid groups having a salt-forming ability such as a carboxylic acid group, a sulfonic acid group, a phosphoric acid group, and a hydroxy group, and atom groups having a coordination ability such as amines and carbonyl groups can be used.

Examples of commercially available sulfur atom-containing epoxy resins include diphenyl sulfide type epoxy resin YSLV-120TE (commercially available from NIPPON STEEL Chemical & Material Co., Ltd.).

Examples of commercially available nitrogen atom-containing epoxy resins include TEPIC (registered trademark)-S, -L, -VL (product name) (commercially available from ADEKA). Preferable examples of phosphorus atom-containing chelate-modified epoxy resins include those having phosphate ester. Examples of commercially available phosphorus atom-containing chelate-modified epoxy resins include Adeka Resin (registered trademark) EP-49-10P and EP-49-10P2 (commercially available from ADEKA). In order to improve adhesion to a metal, a phosphorus atom-containing chelate-modified epoxy resin is particularly preferable.

In the cationically polymerizable composition which is one embodiment of the disclosure, the content of the chelate-modified epoxy resin (D) with respect to a total amount of (A) to (D) is preferably 10 to 50 mass % and more preferably 15 to 30 mass %. When the content of the chelate-modified epoxy resin (D) is within this range, the cationically polymerizable composition has excellent handling properties and the obtained cured product exhibits excellent properties regarding heat resistance, transparency, yellowing resistance, heat-resistant yellowing resistance, light resistance and adhesion, and photocationic curability. Here, when the content in the cationically polymerizable composition is calculated, the chelate-modified epoxy resin (D) is not included in the "cationically polymerizable compound (B)."

In the cationically polymerizable composition, as necessary, various components such as a solvent (E), a cationic polymerization initiator (F), an antioxidant (G), a surfactant (H), a photosensitizer (I), a curing agent (J), a curing accelerator (K), a coupling agent (L), and other resins may be added.

Solvent (E)

The cationically polymerizable composition which is one embodiment of the disclosure may include a solvent (E). Examples of solvents (E) include hydrocarbon solvents (hexane, benzene, toluene, etc.), ether solvents (diethyl ether, tetrahydrofuran (THF), 2-methyltetrahydrofuran, diphenyl ether, anisole, dimethoxybenzene, cyclopentyl methyl ether (CPME), etc.), halogenated hydrocarbon solvents (methylene chloride, chloroform, chlorobenzene, etc.), ketone solvents (acetone, methyl ethyl ketone, methyl isobutyl ketone, etc.), alcohol solvents (methanol, ethanol, propanol, isopropanol, n-butyl alcohol, t-butyl alcohol, etc.), nitrile solvents (acetonitrile, propionitrile, benzonitrile, etc.), ester solvents (ethyl acetate, butyl acetate, etc.), carbonate solvents (ethylene carbonate, propylene carbonate, etc.), amide solvents (N,N-dimethylformamide. N,N-dimethylacetamide. N-methylpyrrolidone), hydrochlorofluorocarbon solvents (HCFC-141b, HCFC-225), hydrofluorocarbon (HFCs) solvents (HFCs having 2 to 4, 5 and 6 or more carbon atoms), perfluorocarbon solvents (perfluoropentane, perfluorohexane), alicyclic hydrofluorocarbon solvents (fluorocyclopentane, fluorocyclobutane), oxygen-containing fluorine solvents (fluoroether, fluoropolyether, fluoroketone, fluoroalcohol), aromatic fluorine solvents (α,α,α-trifluorotoluene, hexafluorobenzene), and water. These may be used alone or two or more thereof may be used in combination.

For example, in consideration of coating properties, the amount of the solvent (E) used is preferably an amount in which the concentration of (A) to (D) is 20 to 98.5 mass %, more preferably an amount in which the concentration of (A) to (D) is 40 to 95 mass %, and most preferably an amount in which the concentration of (A) to (D) is 60 to 90 mass % in the total amount of the cationically polymerizable composition.

Cationic Polymerization Initiator (F)

Examples of cationic polymerization initiators (F) include an active energy ray polymerization initiator that generates a cationic species or a Lewis acid by active energy rays such as ultraviolet rays and a thermal polymerization initiator that generates a cationic species or a Lewis acid by heating. In addition, cationic polymerization initiators may be used alone or two or more thereof may be used in combination.

Examples of active energy ray cationic polymerization initiators include aryl sulfonium complex salts, aromatic sulfonium or iodonium salts of halogen-containing complex ions, and aromatic onium salts of Group II, Group V and Group VI elements. Some of these salts are available as products. Specific examples of active energy ray cationic polymerization initiators include [CPI-110P (registered trademark)], [CPI-210K (registered trademark)], [CPI-210S (registered trademark)], [CPI-300PG (registered trademark)], and [CPI-410S (registered trademark)], which are commercially available from San-Apro Ltd., [Adeka Optomer (registered trademark) SP-130], [Adeka Optomer (registered trademark) SP-140], [Adeka Optomer (registered trademark) SP-150], [Adeka Optomer (registered trademark) SP-170], and [Adeka Optomer (registered trademark) SP-171], which are commercially available from ADEKA, and [IRGACURE (registered trademark) 250], [IRGACURE (registered trademark) 270], and [IRGACURE (registered trademark) 290], which are commercially available from BASF.

Regarding the thermal cationic polymerization initiator, triflic acid salts, and cationic or protonic acid catalysts such as boron trifluoride are used. Preferable examples of thermal cationic polymerization initiators include triflic acid salts, and specific examples thereof include diethylammonium trifluate, diisopropylammonium trifluate, and ethyldiisopropylammonium trifluate. On the other hand, among aromatic onium salts used as active energy ray cationic polymerization initiators, there are those that generate a cationic species by heating, and these can be used as thermal cationic polymerization initiators.

The thermal cationic polymerization initiator is preferable because it can be uniformly added into the cationically polymerizable composition and can be cured in a catalyst type, it can be cured at a low temperature for a short time, and solvent stability is also favorable. In addition, among these cationic polymerization initiators, aromatic onium salts are preferable because they have excellent balance between handling properties, latency, and curability, and among these, diazonium salts, iodonium salts, sulfonium salts and phosphonium salts are preferable because they have an excellent balance between handling properties and latency.

Specific examples of commercially available thermal cationic polymerization initiators include product names "Adeka Opton CP-66." and "CP-77" (commercially available from commercially available from ADEKA), product names "San-Aid SI-45L," "SI-60L," "SI-80L," "SI-100L," "SI-110L," "SI-180L," "SI-B2A," "SI-B3," and "SI-B3A" (commercially available from Sanshin Chemical Industry Co., Ltd.), and product name "FC-520" (commercially available from Sumitomo 3M Ltd.). These thermal cationic polymerization initiators may be used alone or two or more thereof may be used in combination.

Antioxidant (G)

The cationically polymerizable composition according to one embodiment of the disclosure may include an antioxidant (G). When the antioxidant (G) is included, improvement in heat resistance and weatherability can be expected. In addition, when the antioxidant (G) is included, it is possible to prevent oxidative deterioration during curing and minimize coloring. The blending ratio of the antioxidant (G) in the cationically polymerizable composition is preferably 0.1 mass % to 2.0 mass % based on the total amount of the cationically polymerizable composition.

Regarding the antioxidant (G), phenolic and phosphorus antioxidants may be exemplified, and examples thereof include monophenols, bisphenols, polymer type phenols, phosphites and oxaphosphaphenanthrene oxides.

Examples of monophenols include 2,6-di-t-butyl-p-cresol, butylated hydroxyanisole, 2,6-di-t-butyl-p-ethyl phenol and stearyl-β-(3,5-di-t-butyl-4-hydroxyphenyl)propionate.

Examples of bisphenols include 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol) and 3,9-bis[1,1-dimethyl-2-{β-(3-t-butyl-4-hydroxy-5-methylphenyl) propionyloxy}ethyl]2,4,8,10-tetraoxaspiro [5,5] undecane.

Examples of polymer type phenols include 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl) propionate]methane, bis[3,3'-bis-(4'-hydroxy-3'-t-butylphenyl)butyric acid]glycol ester, 1,3,5-tris(3',5'-di-t-butyl-4'-hydroxybenzyl)-S-triazine-2,4,6-(1H, 3H, 5H)trione and tocopherol.

Examples of phosphites include triphenylphosphine, diphenylisodecylphosphite, phenyldiisodecylphosphite, tris (nonylphenyl)phosphite, diisodecylpentaerythritol phosphite, tris(2,4-di-t-butylphenyl)phosphite, cyclic neopentanetetraylbis(octadecyl)phosphite, cyclic neopentanetetraylbis(2,4-di-t-butylphenyl)phosphite, cyclic neopentanetetraylbis(2,4-di-t-butyl-4-methylphenyl)phosphite and bis[2-t-butyl-6-methyl-4-{2-(octadecyloxycarbonyl)ethyl}phenyl]hydrogen phosphite.

Examples of oxaphosphaphenanthrene oxides include 9,10-dihydro-9-oxa-10-phosphaphenanthrene-10-oxide. 10-(3,5-di-t-butyl-4-hydroxybenzyl)-9,10-dihydro-9-oxa-10-phosphaphenanthrene-10-oxide and 10-decyloxy-9,10-dihydro-9-oxa-10-phosphaphenanthrene-10-oxide.

Examples of commercially available antioxidants include Irgafos (registered trademark) 168, Irgafos (registered trademark) XP40, Irgafos (registered trademark) XP60, Irganox (registered trademark) 1010, Irganox (registered trademark) 1035, Irganox (registered trademark) 1076, Irganox (registered trademark) 1135. Irganox (registered trademark) 1520L (commercially available from BASF Japan), and ADK STAB (registered trademark) AO-20, AO-30, AO-40, AO-50, AO-60, AO-75, AO-80, AO-330 (commercially available from ADEKA). These may be used alone or two or more thereof may be used in combination.

Surfactant (H)

The surfactant (H) can be used to improve wettability, levelling properties or coating properties to the substrate, and the amount of the surfactant (H) added and used is generally 0.01 to 1 mass % and preferably 0.1 to 0.3 mass % with respect to 100 mass % of the cationically polymerizable composition. The surfactant (H) may be one type of compound or two or more types of compounds may be used in combination.

Examples of surfactants (H) include Polyflow No. 45, Polyflow KL-245, Polyflow No. 75, Polyflow No. 90, and Polyflow No. 95 (commercially available from Kyoeisha Chemical Co., Ltd.), Disperbyk 161, Disperbyk 162, Disperbyk 163, Disperbyk 164, Disperbyk 166, Disperbyk 170, Disperbyk 180, Disperbyk 181, and Disperbyk 182, BYK (registered trademark) 300, BYK (registered trademark) 306, BYK (registered trademark) 310, BYK (registered trademark) 320, BYK (registered trademark) 330, BYK (registered trademark) 342, BYK (registered trademark) 346, BYK (registered trademark)-UV3500, BYK (registered trademark)-UV3570 (commercially available from BYK Japan), KP-341, KP-358, KP-368, KF-96-50CS, and KF-50-100CS (commercially available from Shin-Etsu Chemical Co., Ltd.), Surflon (registered trademark) SC-101, Surflon (registered trademark) KH-40 (commercially available from AGC Seimi Chemical Co., Ltd.), Ftergent (registered trademark) 222F, Ftergent (registered trademark) 251, FTX-218 (commercially available from Neos Corporation), EFTOP (registered trademark) EF-351, EFTOP (registered trademark) EF-352, EFTOP (registered trademark) EF-601, EFTOP (registered trademark) EF-801, EFTOP (registered trademark) EF-802 (commercially available from Mitsubishi Materials Corporation), Magaface (registered trademark) F-410, Magaface (registered trademark) F-430, Magaface (registered trademark) F-444, Magaface (registered trademark) F-472SF, Magaface (registered trademark) F-475, Magaface (registered trademark) F-477, Magaface (registered trademark) F-552, Magaface (registered trademark) F-553, Magaface (registered trademark) F-554, Magaface (registered trademark) F-555, Magaface (registered trademark) F-556, Magaface (registered trademark) F-558, Magaface (registered trademark) F-563, Magaface (registered trademark) R-94, Magaface (registered trademark) RS-75, Magaface (registered trademark) RS-72-K (commercially available from DIC), TEGO (registered trademark) Rad 2200N. TEGO (registered trademark) Rad 2250N (commercially available from Evonik Degussa Japan Co., Ltd.), and Silaplane (registered trademark) FM-0511 (commercially available from JNC).

Photosensitizer (I)

In the cationically polymerizable composition according to one embodiment of the disclosure, the photosensitizer (I) may be used as an additive. When the photosensitizer (I) is added, the polymerization reaction can be performed efficiently even in the long wavelength side range.

Examples of photosensitizers (I) include an aromatic nitro compound, coumarins (7-diethylamino-4-methylcoumarin, 7-hydroxy4-methylcoumarin, ketocoumarin, carbonyl bisquemarin), aromatic 2-hydroxyketone, and amino-substituted aromatic 2-hydroxyketones (2-hydroxybenzophenone, mono- or di-p-(dimethylamino)-2-hydroxybenzophenone), acetophenone, anthraquinone, xanthone, thioxanthone, 2-chlorothioxanthone, 2-methylthioxanthone, 2,4-diethylthioxanthone, 2-isopropylthioxanthone, benzanthrone), thiazolines (2-benzoylmethylene-3-methyl-β-naphthiazoline, 2-(β-naphthoyl methylene)-3-methylbenzothiazolin, 2-(α-naphthoyl methylene)-3-methylbenzothiazolin, 2-(4-biphenoyl methylene)-3-methyl-benzo thiazoline, 2-(β-naphthoyl methylene)-3-methyl-β-naphthiazoline, 2-(4-biphenoyl methylene)-3-methyl-β-naphthiazoline, 2-(p-fluorobenzoyl-methylene)-3-methyl-β-naphthiazoline), oxazolines (2-benzoylmethylene-3-methyl-β-naphthooxazoline, 2-(β-naphthoylmethylene)-3-methylbenzoxazoline, 2-(α-naphthoyl methylene)-3-methylbenzoxazoline, 2-(4-biphenoyl methylene)-3-methylbenzoxazoline, 2-(β-naphthoyl methylene)-3-methyl-β-naphthooxazoline, 2-(4-biphenoyl methylene)-3-methyl-β-naphthooxazoline, 2-(p-fluorobenzoylmethylene)-3-methyl-β-naphthoxazoline), benzothiazole, nitroaniline (m- or p-nitroaniline, 2,4,6-trinitroaniline) and nitroacenaphthene (5-nitroacenaphthene), 2-[(m-hydroxy-p-methoxy)styryl]benzothiazole, benzoin alkyl ether, N-alkylated phthalone, acetophenone ketal (2,2-dimethoxyphenyl etanone), naphthalene, 2-naphthalene methanol, 2-naphthalene carboxylic acid, anthracene, 9-anthracene methanol, 9-anthracene carboxylic acid, 9,10-diphenylanthracene, 9,10-bis(phenylethynyl) anthracene, 2-methoxyanthracene, 1,5-dimethoxyanthracene, 1,8-dimethoxyanthracene, 9,10-diethoxyanthracene, 6-chloroanthracene, 1,5-dichloroanthracene. 5,12-bis(phenylethynyl)naphthacene, chrysene, pyrene, benzopyran, azoindolizine, furanocoumarin, phenothiazine, benzo [c] phenothiazine. 7-H-benzo [c] phenothiazine, triphenylene, 1,3-dicyanobenzene, and phenyl-3-cyanobenzoate.

Preferable examples thereof include 9,10-diphenylanthracene, 9,10-diethoxyanthracene, and 9,10-dibutoxyanthracene.

Examples of commercial products include photosensitizers [9,10-diphenyl anthracene (product name)] (commercially available from Kanto Chemical Co., Inc.), photocationic sensitizers [Anthracure (registered trademark) UVS-1101], [Anthracure (registered trademark) UVS-1331] (commercially available from Kawasaki Kasei Chemicals Ltd.), and photoradical sensitizers [Anthracure (registered trademark) UVS-581] (commercially available from Kawasaki Kasei Chemicals Ltd.).

Curing Agent (J)

In the cationically polymerizable composition according to one embodiment of the disclosure, a curing agent (J) may be used as an additive. Examples of curing agents (J) include acid anhydrides and amines.

(Acid Anhydride)

Specific examples of acid anhydrides used as the curing agent (J) include phthalic anhydride, maleic anhydride, trimellitic anhydride, piromellitic anhydride, hexahydrophthalic anhydride, 3-methyl-cyclohexanedicarboxylic acid anhydride, 4-methyl-cyclohexanedicarboxylic acid anhydride, and a mixture of 3-methyl-cyclohexanedicarboxylic acid anhydride and 4-methyl-cyclohexanedicarboxylic acid anhydride, tetrahydrophthalic anhydride, nadic anhydride, methyl nadic anhydride, norbornane-2,3-dicarboxylic acid anhydride, methyl norbornane-2,3-dicarboxylic acid anhydride, cyclohexane-1,3,4-tricarboxylic acid-3,4-anhydride and derivatives thereof. Among these, 4-methyl-cyclohexanedicarboxylic acid anhydride, and a mixture of 3-methyl-cyclohexanedicarboxylic acid anhydride and 4-methyl-cyclohexanedicarboxylic acid anhydride are a liquid at room temperature and thus suitable because they are easy to handle.

(Amine)

Specific examples of amines used as the curing agent (J) include ethylenediamine, diethylenetriamine, triethylenetetramine, tetraethylenepentamine, dimethylaminopropylamine, diethylaminopropylamine, hexamethylenetriamine, bis-cyanoethylamine, and tetramethylguanidine, pyridine, piperidine, methanediamine, isophorone diamine. 1,3-bisaminomethyl-cyclohexane, bis(4-amino-cyclohexyl)methane, and bis 4-amino-3-methyl-cyclohexyl)methane, benzylmethylamine, α-methyl-benzylmethylamine, m-phenylenediamine, m-xylylenediamine, diaminodiphenylmethane, diaminodiphenylsulfone, and diamino diphenyl ether.

When an acid anhydride or an amine is used as the curing agent (J), a preferable usage ratio of the acid anhydride or amine is 0.7 to 1.2 equivalents and more preferably 0.9 to 1.1 equivalents with respect to 1 equivalent of alicyclic epoxy groups included in the compound (A) represented by Formula (1) and cationically polymerizable cyclic ethers of the (B) compound having a vinyl group and a cationically polymerizable cyclic ether. When the amount of the curing agent (J) added is within the above range, this is preferable because the curing reaction rapidly proceeds and the obtained cured product is not colored.

Curing Accelerator (K)

The curing accelerator (K) can be used to promote the reaction between the cationically polymerizable compound (B) and the curing agent (J) and improve the heat resistance, chemical resistance, and hardness of the cured film. Generally 0.01 to 5 mass % of the curing accelerator (K) with respect to a solid content of 100 mass % of the cationically polymerizable composition (the remaining components obtained by removing the solvent (E) from the cationically polymerizable composition) is added and used. The curing accelerators (K) may be used alone or two or more thereof may be used in combination.

Regarding the curing accelerator (K), any accelerator having a function of promoting the reaction between the cationically polymerizable compound (B) and the curing agent (J) can be used, and examples thereof include an imidazole-based curing accelerator, a, phosphine-based curing accelerator, an ammonium-based curing accelerator, and the like which promote the reaction between an epoxy compound and an epoxy curing agent. Specific examples thereof include trimethylolpropane triacrylate, ethylene oxide-modified trimethylolpropane tri(meth)acrylate, trimethylolpropane PO-modified triacrylate, trimethylolpropane EO-modified triacrylate, glycerol tri(meth)acrylate, ethoxylated glycerin tri(meth)acrylate, epichlorohydrin-modified glycerol tri(meth)acrylate, diglycerin EO-modified acrylate, alkyl-modified dipentaerythritol penta(meth)acrylate, alkyl-modified dipentaerythritol tetra(meth)acrylate, alkyl-modified dipentaerythritol tri(meth)acrylate, ethoxylated isocyanuric ring tri(meth)acrylate, ε-caprolactone-modified tris-(2-acryloxyethyl)isocyanurate, propylene oxide-modified trimethylolpropane tri(meth)acrylate, epichlorohydrin-modified trimethylolpropane tri(meth)acrylate, ditrimethylolpropane tetra(meth)acrylate, isocyanuric acid EO-modified di/triacrylate, pentaerythritol tri/tetraacrylate (ARONIX M305, M450; commercially available from Toagosei Co., Ltd.), dipentaerythritol penta/hexaacrylate (ARONIX M402; commercially available from Toagosei Co., Ltd.), diglycerin EO-modified acrylate, ethoxylated isocyanuric acid triacrylate, tris[(meth)acryloxyethyl]isocyanurate, ethoxylated glycerin triacrylate, ethoxylated pentaerythritol tetraacrylate, 2-undecylimidazole, 2-heptadecylimidazole, 2-phenylimidazole, 2-phenyl-4-methylimidazole, and 2,3-dihydro-1H-pyrrolo [1,2-a] benzimidazole.

Coupling Agent (L)

The coupling agent (L) can also be used to improve the adhesion between the cured film formed from the cationically polymerizable composition and the substrate, and generally 0.01 to 10 mass % of the coupling agent (L) with respect to a total solid content of the cationically polymerizable composition can be added and used.

Regarding the coupling agent (L), silane-based, aluminum-based and titanate-based compounds can be used. Specific examples thereof include silane-based compounds such as vinyl trichlorosilane, vinyl trimethoxysilane, vinyltriethoxysilane, 2-(3,4-epoxycyclohexyl)ethyltrimethoxysilane, 3-glycidoxypropyl dimethylethoxysilane. 3-glycidoxypropylmethyldiethoxysilane, 3-glycidoxypropyltriethoxysilane. 3-glycidoxypropyltrimethoxysilane, 3-aminopropyltrimethoxysilane, 3-aminopropyltriethoxysilane. 3-methacryloxypropyltrimethoxysilane, and 3-methacryloxypropyltriethoxysilane; aluminum-based compounds such as acetalkoxy aluminum diisopropylate; and titanate-based compounds such as tetraisopropylbis(dioctylphosphite)titanate. Among these, 3-glycidoxypropyltrimethoxysilane is preferable because it has a strong effect of improving the adhesion. Examples of commercially available coupling agents include Sila-Ace S510 (commercially available from JNC) and Sila-Ace S530 (commercially available from JNC).

Other Resins

The cationically polymerizable composition which is one embodiment of the disclosure may include resins (other resins) other than the cationically polymerizable compound (B), the compound having a vinyl group and a cationically polymerizable cyclic ether (C), the chelate-modified epoxy resin (D) as long as the effects of the disclosure are not impaired. Regarding the other resins, a resin having a crosslinkable functional group is preferable. For example, a radically polymerizable resin containing an acrylate or methacrylate and a thiol resin that can be polymerized with a vinyl group or the like can be used.

[Varnish Preparation Method]

The cationically polymerizable composition according to one embodiment of the disclosure may or may not include the solvent (E). When the solvent (E) is used, the compound (A) represented by Formula (1), the cationically polymerizable compound (B), and the compound having a vinyl group and a cationically polymerizable cyclic ether (C), and the chelate-modified epoxy resin (D) can be dissolved in the solvent (E) to prepare a varnish. When the concentration of the component (A) is high, in consideration of coating properties, the solvent (E) is preferably used to prepare a varnish.

Specifically, for example, components other than the cationic polymerization initiator, the components (A) to (D), and the component (G) to component (I) can be mixed, and heated, stirred and dissolved at 70° C. or lower, and the cationic polymerization initiator (F) can be then added and dissolved to prepare a varnish.

A general-purpose coating method such as spin coating or various printing methods can be applied to the varnish, and when the varnish is used as a coating agent, it is possible to produce a cured product inexpensively and easily. A method of applying a cationically polymerizable composition and a method of curing a cationically polymerizable composition will be described in the following section 2. Laminate.

2. Laminate

A second embodiment of the disclosure is a laminate including a substrate and a cured film obtained by curing a cationically polymerizable composition including at least a compound (A) represented by Formula (1), a cationically polymerizable compound (B), a compound having a vinyl group and a cationically polymerizable cyclic ether (C), and a chelate-modified epoxy resin (D), which is formed on the substrate.

The compound (A) represented by Formula (1), the cationically polymerizable compound (B), the compound having a vinyl group and a cationically polymerizable cyclic ether (C), and the chelate-modified epoxy resin (D) included in the cationically polymerizable composition are the same as the compound (A) represented by Formula (1), the cationically polymerizable compound (B), the compound having a vinyl group and a cationically polymerizable cyclic ether (C), and the chelate-modified epoxy resin (D) described in the first embodiment, and the above description is applied. In addition, the above description regarding the cationically polymerizable composition according to the first embodiment of the disclosure can be applied for constituent components of the cationically polymerizable composition other than (A) to (D) and the like. In order to lower the viscosity of the cationically polymerizable composition, minimize curing shrinkage during curing, improve adhesion of the cured product, and increase curability (curing rate) of the composition, the cationically polymerizable compound (B) in the cationically polymerizable composition including at least one bi- or higher functional epoxy compound and at least one bi- or higher functional oxetane compound, and a ratio between the content (mass %) of the epoxy compound and the content (mass %) of the oxetane compound in the cationically polymerizable composition is preferably 10:1 to 2:1, more preferably 8:1 to 2:1, and still more preferably 5:1 to 2:1. The description in the following section [curing process] can be applied for the method of curing a cationically polymerizable composition.

(Substrate)

The substrate is not particularly limited, and may be selected according to applications of the laminate. For example, glass substrates such as quartz, barium borosilicate glass and aluminum borosilicate glass; calcium fluoride substrates; metal oxide substrates such as indium tin oxide (ITO); ceramic substrates; plastic films such as a polycarbonate (PC) film, a silicone film, a polyethylene terephthalate (PET) film, a polyethylene naphthalate (PEN) film, a cycloolefin polymer (COP) film, a polypropylene film, a polyethylene film, an acrylic polymer film, a polyvinyl alcohol film, a triacetyl cellulose film, a polyimide (PI) film, and a liquid crystal polymer film; semiconductor substrates such as a carbon fiber film and a silicon wafer; metal substrates such as SUS, aluminum, copper, and silver; and the like can be used.

The cured product obtained by curing the cationically polymerizable composition according to the first embodiment can realize excellent adhesion not only to ITO, aluminum, and copper but also to PET, silver, PI, and COP.

A method of producing a laminate according to the second embodiment of the disclosure includes an application process of applying a cationically polymerizable composition to a substrate and a curing process of curing a cationically polymerizable composition layer formed on the substrate.

[Application Process]

The method of applying a cationically polymerizable composition to a substrate is not limited, and a method of dropwise-adding a cationically polymerizable composition to a substrate and performing coating by a wire bar, an application method using a gravure coater, a lip coater, a slit die, or an inkjet method, and the like may be exemplified. The method of dropwise-adding a cationically polymerizable composition to a substrate and performing coating by a wire bar and the application using a gravure coater or a slit die are more preferable because it is possible to apply a certain amount of varnish uniformly.

The application amount may be appropriately set according to applications.

In consideration of handling properties and cost, it is preferable to apply the cationically polymerizable composition at room temperature. Therefore, the rotational viscosity of the cationically polymerizable composition at 25° C., is preferably 1 to 3.000 mPa·sec and more preferably 1 to 500 mPa·sec.

[Curing Process]

The compound (A) represented by Formula (1), the cationically polymerizable compound (B), the compound having a vinyl group and a cationically polymerizable cyclic ether (C), and the cationically polymerizable composition (D) including a chelate-modified epoxy compound are cationically polymerized and cured, but can be cured by at least one of heating and active ray emission, and curing with ultraviolet rays is preferable.

When curing is performed with active rays, a conventionally known method can be used, and ultraviolet rays can be used as the active rays. Examples of light sources for emitting ultraviolet rays include a metal halide type, a high-pressure mercury lamp, and a UV-LED lamp.

In the curing process, a commercially available device can be used. Examples thereof include UV exposure devices [LH10-10Q (product name). H bulb (product name) commercially available from Heraeus], and LED UV exposure devices [ASM1503NM-UV-LED (product name) commercially available from Asumi Giken Ltd.]. The device may be designed so that the application process and the curing process can be continuously performed.

When curing is performed with active rays, conditions of the curing process may be appropriately set according to the thickness of the cationically polymerizable composition and the like.

Specifically, for example, ultraviolet rays with a wavelength of 254 nm or 365 nm are emitted in a cumulative exposure amount of 0.5 to 1.5 $J/cm^2$ to the cationically polymerizable composition layer applied to the substrate and formed with a thickness of 4 to 5 μm using UV exposure devices [LH10-10Q (product name), and H bulb (product name) commercially available from Heraeus].

Here, emission is generally performed from the side of the coated surface. However, when a substrate through which ultraviolet rays can pass is used, ultraviolet rays can be emitted from the side of the surface opposite to the coated surface.

In the case of thermosetting, the heating method is not particularly limited, and heating techniques using a conventionally known method in which heating can be performed at a predetermined temperature, for example, a heat circulation method, a hot air heating method, or an induction heating method can be used. For a more preferably used method, a curing furnace using hot air circulation or a curing furnace using infrared rays can be used. Alternatively, a hot air circulation curing furnace and an infrared ray curing furnace may be used in combination, and an infrared heater may be incorporated into a hot air circulation curing furnace and heating may be performed at the same time. In addition, a photo-curing furnace and a thermosetting furnace may be used in combination, and heating and active ray emission may be performed at the same time.

The curing conditions for thermosetting may be appropriately set according to the thickness of the cationically polymerizable composition and the like.

3. Cured Product

A cured product of a cationically polymerizable composition according to one embodiment of the disclosure and a laminate according to one embodiment of the disclosure have high adhesion to various substrates, particularly, silver, and can have high transparency.

The laminate according to one embodiment of the disclosure has high adhesion of the cationically polymerizable composition including at least the compound (A) represented by Formula (1), the cationically polymerizable compound (B), the compound having a vinyl group and a cationically polymerizable cyclic ether (C), and the chelate-modified epoxy resin (D) to all three types of substrates, which is 4B or more in adhesion evaluation according to Evaluation Method 1. It is more preferable for adhesion of all to be 5B or more.

In addition, when the cured product of the cationically polymerizable composition according to one embodiment of the disclosure and the laminate according to one embodiment of the disclosure are used for applications requiring transparency, a total light transmittance is preferably 90% or more.

[Evaluation Method 1]

On three types of substrates: a metal oxide substrate, a silver substrate, and a plastic film with a thickness of 50 μm, a cured film formed from the cationically polymerizable composition including at least the compound (A) represented by Formula (1), the cationically polymerizable compound (B), the compound having a vinyl group and a cationically polymerizable cyclic ether (C), and the chelate-modified epoxy resin (D) and having a thickness of 4 to 5 μm is formed.

[Chem. 11]

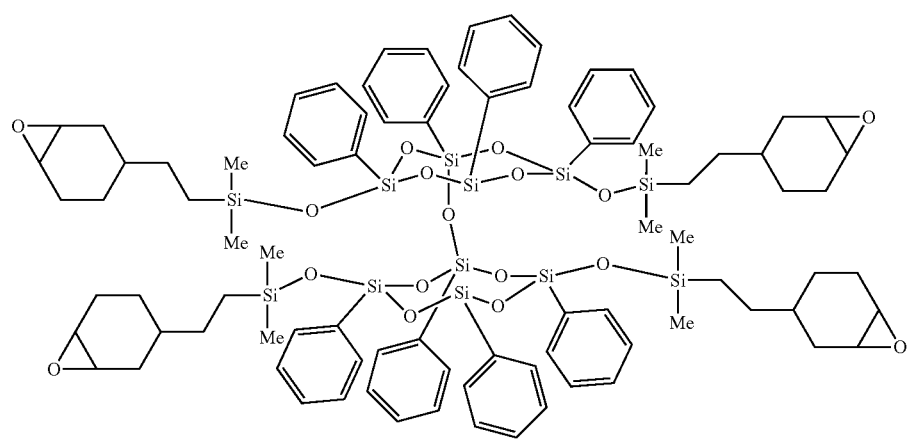

(2)

The formed cured films are subjected to an adhesion test using an adhesive cross-cut method with a clearance interval of 1 mm and 25 (5×5) or 100 (10×10) meshes according to ASTM D3359 (Method B), and evaluated according to the following criteria.

(Evaluation criteria)

5B: peeled area 0%

4B: peeled area less than 5%

3B: peeled area 5% or more and less than 15%

2B: peeled area 15% or more and less than 35%

1B: peeled area 35% or more and less than 65%

0B: peeled area 65% or more

For the transparency of the cured product, a cured film formed from the cationically polymerizable composition including at least the compound (A) represented by Formula (1), the cationically polymerizable compound (B), the compound having a vinyl group and a cationically polymerizable cyclic ether (C), and the chelate-modified epoxy resin (D) and having a thickness of 4 to 5 μm is formed on a PET substrate with a thickness of 50 μm, and a total light transmittance of the PET substrate with a cured film may be measured using a haze meter (NDH 5000 commercially available from Nippon Denshoku Industries Co., Ltd.).

<Applications>

The cured product of the cationically polymerizable composition according to one embodiment of the disclosure and the laminate according to one embodiment of the disclosure are suitably used as an adhesive layer for various electronic components because they have excellent adhesion. In addition, they are also suitably used as an insulating material and a protective film used on a wiring part of a printed wiring board having an electronic circuit.

EXAMPLES

Hereinafter, the disclosure will be described in more detail with reference to examples and comparative examples, but the disclosure is not limited to these examples as long as other examples do not depart from the gist thereof.

Hereinafter, compounds used in examples and comparative examples will be described.

<Compound (A) Represented by Formula (1)>

A compound represented by Formula (2) was synthesized and used.

<Cationically Polymerizable Compound (B)>

Epoxy compound [Celloxide (registered trademark) CEL2021P commercially available from Daicel Corporation], oxetane compound [Aron Oxetane (registered trademark) OXT-221 (DOX) commercially available from Toagosei Co., Ltd.]

<Compound Having a Vinyl Group and a Cationically Polymerizable Cyclic Ether (C)>

Epoxy compound [Celloxide (registered trademark) CEL2000] commercially available from Daicel Corporation <Chelate-Modified Epoxy Resin (D)>

[Adeka Resin (registered trademark) EP-49-10P2] commercially available from ADEKA

[Adeka Resin (registered trademark) EP-49-10P] commercially available from ADEKA (Content of phosphorus-containing epoxy resin 40 mass %)

<Cationic Polymerization Initiator (F)>

[CPI-110P (product name)] commercially available from San-Apro Ltd.

<Antioxidant (G)>

Antioxidant [ADK STAB (product name) AO-60] commercially available from ADEKA

<Surfactant (H)>

Surfactant [Magaface (registered trademark) F563] commercially available from DIC <Photosensitizer (I)>
I1: photosensitizer [9,10-diphenylanthracene (product name)] commercially available from Kanto Chemical Co., Inc.
I2: photocationic sensitizer [Anthracure (registered trademark) UVS-1101] commercially available from Kawasaki Kasei Chemicals Ltd.
<Others>
[Cyclohexanedimethanol divinyl ether (abbreviation) CHDVE] commercially available from Nippon Carbide Industries Co., Inc.

Synthesis Example 1: Synthesis of Tetrafunctional Alicyclic Epoxy-Containing Double-Decker Type Silsesquioxane (Compound Represented by Formula (2))

According to the following method, a compound represented by Formula (2) was produced.

200 g of the compound represented by Formula (a) (hereinafter, referred to as a compound (a)) synthesized by the method disclosed in PCT International Publication No. WO 2004/024741 and 306 g of dehydrated ethyl acetate (commercially available from Kanto Chemical Co., Inc.) were put into a reaction container and heated at 75° C. and stirred. 0.13 mL of PT-VTSC-3.0X (commercially available from Umicore Japan) was added thereto and 96 g of Celloxide 2000 (commercially available from Daicel Corporation) was added dropwise. Then, the reaction solution was refluxed and after it was confirmed that a peak at 2,140 cm$^{-1}$ had disappeared by FT-IR, heating was stopped and cooling was performed to room temperature. Then, 40 g of ethyl acetate (commercially available from Wako Pure Chemical Industries. Ltd.) and 15 g of active carbon (commercially available from Wako Pure Chemical Industries, Ltd.) were added thereto, the mixture was stirred overnight, and active carbon was filtered and removed using Celite. The filtrate was concentrated with an evaporator until the concentration of the solid content reached about 80%, 750 g of methanol (commercially available from Wako Pure Chemical Industries. Ltd.) was added while stirring the solution, and thereby a white precipitate was obtained. The obtained precipitate was filtered and additionally washed with methanol and dried under a reduced pressure, and thereby 255 g of the compound represented by Formula (2) was obtained.

[Chem. 12]

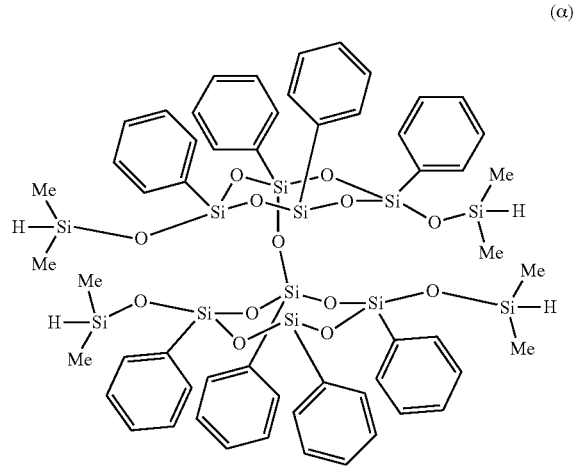

(α)

(Preparation of Cationically Polymerizable Composition)

Under an environment in which ultraviolet rays were blocked, 15.0 g of the compound represented by Formula (2), 39.4 g of Celloxide (registered trademark) CEL2021P, 9.9 g of Aron Oxetane (registered trademark) OXT-221, 10.0 g of Celloxide (registered trademark) CEL2000, 24.2 g of Adeka Resin (registered trademark) EP-49-10P2, 1.0 g of ADK STAB (product name) AO-60, 0.2 g of Magaface (registered trademark) F563, 0.2 g of 9,10-diphenylanthracene (product name), and 0.1 g of Anthracure (registered trademark) UVS-1101 were heated, stirred and dissolved at 50 to 100° C. under nitrogen. 1% of a photoacid generating agent CPI-110P (product name) as a photocationic polymerization initiator was added to the liquid composition and stirred and dissolved to prepare a cationically polymerizable composition of Example 1.

A cationically polymerizable composition of Comparative Example 1 was prepared in the same manner as in Example 1 except that 10 g of CHDVE was used in place of Celloxide (registered trademark) CEL2000.

A cationically polymerizable composition of Comparative Example 2 was prepared in the same manner as in Example 1 except that the amount of the compound represented by Formula (2) was changed to 19.7 g, 10.0 g of EOXTVE was used in place of Celloxide (registered trademark) CEL2000, and 29.5 g of Adeka Resin (registered trademark) EP-49-10P was used in place of Adeka Resin (registered trademark) EP-49-10P2.

<Measurement of Viscosity of Cationically Polymerizable Composition>

The viscosities of the cationically polymerizable compositions of Example 1, and Comparative Examples 1 and 2 were measured using a TV-22 type viscometer cone plate type (commercially available from Toki Sangyo Co., Ltd.) at a constant temperature bath temperature of 25° C.

(Production of Cured Film)

The cationically polymerizable compositions of Example 1 and Comparative Examples 1 and 2 were applied to various substrates to a thickness of 4 to 5 μm using a wire bar coater, and ultraviolet rays (wavelength: 254 nm, 365 nm) were emitted using UV exposure devices [LH10-10Q (product name) and H bulb (product name) commercially available from Heraeus] to obtain cured films. The thicknesses of the obtained cured films are shown in Table 1. In the table. UV curing (J/cm$^2$) is a cumulative ultraviolet ray exposure amount.

<Adhesion Test: Adhesion Evaluation>

The prepared varnish was applied to an ITO film of a PET substrate with an ITO film (a thickness of 5 mm, commercially available from Sigma-Aldrich), an aluminum substrate with a thickness of 3 mm (commercially available from As One Corporation), a copper substrate with a thickness of 3 mm (commercially available from As One Corporation), a silver substrate with a thickness of 0.3 mm (commercially available from Kenis Ltd.), a PET substrate with a thickness of 50 μm (Lumirror (registered trademark) commercially available from Toray Industries, Inc.), a PI substrate with a thickness of 50 μm (Kapton (registered trademark), commercially available from Du Pont-Toray Co., Ltd.), and a COP substrate with a thickness of 100 μm (ZEONOR (registered trademark), commercially available from Zeon Corporation), and cured films with a thickness of 4 to 5 μm were produced under the same conditions as above. An adhesion test was performed using an adhesive cross-cut method with a clearance interval of 1 mm and 100 meshes according to ASTM D3359 (Method B), and evaluation was performed according to the following criteria. The evaluation results are shown in Table 1. In the table, ITO indicates a PET substrate with an ITO film, Al indicates an aluminum substrate, Cu indicates a copper substrate, Ag indicates a silver substrate, PET indicates a PET substrate, PI indicates a PI substrate, and COP indicates a COP substrate.

5B: peeled area 0%
4B: peeled area less than 5%
3B: peeled area 5% or more and less than 15%
2B: peeled area 15% or more and less than 35%
1B: peeled area 35% or more and less than 65%
0B: peeled area 65% or more

TABLE 1

| | Component | | | Example 1 | Comparative Example 1 | Comparative Example 2 |
|---|---|---|---|---|---|---|
| A | Compound represented by Formula (1) | Compound represented by Formula (2) | (wt %) | 15.0 | 15.0 | 19.7 |
| B | Cationically polymerizable compound | CEL2021P | | 39.4 | 39.4 | 39.4 |
| | | DOX | | 9.9 | 9.9 | 9.9 |
| C | Compound having vinyl group and cationically polymerizable cyclic ether | CEL2000 | | 10.0 | | |
| | Compound having vinyl group | CHDVE | | | 10.0 | |
| D | Chelate-modified epoxy resin | EP-49-10P2 | | 24.2 | 24.2 | |
| | | EP-49-10P | | | | 29.5 |
| Additive | Antioxidant | AO-60 | | 1.0 | 1.0 | 1.0 |
| | Surfactant | F563 | | 0.2 | 0.2 | 0.2 |
| | Photosensitizer | 9,10-Diphenyl-anthracene | | 0.2 | 0.2 | 0.2 |
| | | UVS-1101 | | 0.1 | 0.1 | 0.1 |
| Photoacid generating agent | | CPI-110P | (phr) | 1.0 | 1.0 | 1.0 |
| | Viscosity | | (mPa · s) | 486.0 | 796.0 | 2530.0 |
| | Cumulative exposure amount | | (J/cm$^2$) | 0.5 | 0.5 | 0.5 |
| Cured film | Film thickness | | (μm) | 4.8 | 5.0 | 5.0 |
| Substrate | Metal oxide | ITO | Adhesion | 5B | 0B | 5B |
| | Metal | Al | | 5B | 2B | 5B |
| | | Cu | | 5B | 0B | 5B |
| | | Ag | | 5B | 0B | 0B |
| | Organic resin | PET | | 5B | 4B | 0B |
| | | PI | | 5B | 0B | 3B |
| | | COP | | 5B | 0B | 0B |

Based on the results of Example 1, it was found that the cationically polymerizable composition including all of (A) to (D) had excellent handling properties and the cationically polymerizable composition can provide a cured film having high adhesion to any film of the metal oxide ITO, the metals aluminum, copper, and silver, and the plastics PET, PI, and COP.

Based on the results of Comparative Example 1, it was found that, when the compound having a vinyl group and a cationically polymerizable cyclic ether (C) was not included but a compound having only a vinyl group was included, the viscosity of the composition was about 800 mPa·s, but the adhesion to various substrates was very low.

Based on the results of Comparative Example 2, it was found that, when the compound having a vinyl group and a cationically polymerizable cyclic ether (C) was not included and a compound having only a vinyl group was not included, the viscosity of the composition was about 2,500 mPa·s and the adhesion to the COP substrate was very low.

While the disclosure has been described above with reference to specific embodiments, the embodiments are only examples, and do not limit the scope of the disclosure. That is, the embodiments described in this specification can be variously modified without departing from the spirit and scope of the invention and can be combined with features described in other embodiments within a feasible range.

Since the cationically polymerizable composition according to the disclosure has excellent handling properties, and the cured product obtained by curing the cationically polymerizable composition according to the disclosure has excellent adhesion to various substrates, they are particularly suitably used as members of electronic devices, for example, an adhesive layer of an electronic component and an insulating material and a protective film used on a wiring part of a printed wiring board having an electronic circuit.

What is claimed is:

1. A cationically polymerizable composition including a compound (A) represented by Formula (2), a cationically polymerizable compound (B), a compound (C) having a vinyl group and a cationically polymerizable cyclic ether, and a chelate-modified epoxy resin (D):

[Chem. 2]

(2)

[structure of Formula (2): polyhedral siloxane compound with phenyl groups and epoxycyclohexylethyl-dimethylsilyl arms]

wherein the compound (C) is a compound represented by Formula (4):

[Chem. 4]

(4)

[structure: 4-vinyl-1,2-epoxycyclohexane]

the cationically polymerizable compound (B) contains a compound represented by Formula (B-1) and a compound represented by Formula (B-2), (B-1)

[structure: (3,4-epoxycyclohexyl)methyl 3,4-epoxycyclohexanecarboxylate]

(B-2)

[structure: bis[(3-ethyloxetan-3-yl)methyl] ether]

the chelate-modified epoxy resin (D) includes phosphate ester and is produced via reaction of a bisphenol A epoxy resin with phosphoric acid, and an amount of epoxy group/phosphate group is 28 to 33, an epoxy equivalent is 290 to 320 g/eq, and a phosphate equivalent is 8000 to 11000 g/eq, with respect to a total amount of (A) to (D), a content of the compound (A) represented by Formula (1) is 5 to 30 mass %, a content of the compound (C) having a vinyl group and a cyclic ether is 10 to 30 mass %, a content of the chelate-modified epoxy resin (D) is 10 to 50 mass %, and a content of the cationically polymerizable compound (B) is the remaining component ratio, a ratio between the content (mass %) of the compound represented by Formula (B-1) and the content (mass %) of the compound represented by Formula (B-2) is 5:1 to 2:1.

2. A laminate including a substrate and a cured film obtained by curing the cationically polymerizable composition according to claim 1 formed on the substrate.

3. The laminate according to claim 2, wherein the substrate is one selected from the group consisting of a metal oxide, a metal substrate, and a plastic film.

* * * * *